(12) United States Patent
Gouesbet et al.

(10) Patent No.: US 9,507,922 B1
(45) Date of Patent: Nov. 29, 2016

(54) SYSTEM, METHOD, AND COMPUTER PROGRAM FOR CONDITIONALLY IMPLEMENTING PROTECTED CONTENT

(71) Applicant: Amdocs Software Systems Limited, Dublin (IE)

(72) Inventors: Pierre-Erwann Gouesbet, Longaulnay (FR); Cedric Gegout, Rennes (FR); Nicolas Pierre, Marpire (FR)

(73) Assignees: Amdocs Development Limited, Limassol (CY); Amdocs Software Systems Limited, Dublon (IE)

( * ) Notice: Subject to any disclaimer, the term of this patent is extended or adjusted under 35 U.S.C. 154(b) by 0 days.

(21) Appl. No.: 14/727,643

(22) Filed: Jun. 1, 2015

Related U.S. Application Data

(63) Continuation of application No. 13/743,292, filed on Jan. 16, 2013, now Pat. No. 9,058,493.

(51) Int. Cl.
*G06F 21/64* (2013.01)
*G06F 21/12* (2013.01)
*G06F 21/60* (2013.01)
*G06F 21/51* (2013.01)
*H04L 29/08* (2006.01)
*G06F 21/14* (2013.01)

(52) U.S. Cl.
CPC .......... *G06F 21/12* (2013.01); *G06F 21/14* (2013.01); *G06F 21/51* (2013.01); *G06F 21/60* (2013.01); *G06F 21/64* (2013.01); *H04L 67/02* (2013.01); *G06F 2221/033* (2013.01); *G06F 2221/0724* (2013.01)

(58) Field of Classification Search
None
See application file for complete search history.

(56) References Cited

U.S. PATENT DOCUMENTS

| | | | | |
|---|---|---|---|---|
| 6,341,349 B1* | 1/2002 | Takaragi | ........... | H04L 9/3247 380/28 |
| 6,889,212 B1* | 5/2005 | Wang | .......... | G06Q 30/06 370/259 |
| 7,761,922 B1* | 7/2010 | Baum | .......... | G06F 21/10 726/26 |
| 7,900,239 B2* | 3/2011 | Van Someren | ........ | G06F 21/54 713/176 |
| 8,266,700 B2* | 9/2012 | Sima | .......... | G06F 21/577 713/188 |
| 8,417,954 B1* | 4/2013 | Sagal | .......... | G06F 21/64 713/176 |
| 8,646,070 B1* | 2/2014 | Patsenker | .......... | G06F 8/61 726/22 |
| 8,656,465 B1* | 2/2014 | Fong-Jones | ........ | G06F 21/6281 713/165 |
| 8,688,584 B2* | 4/2014 | Dasgupta | .......... | 705/51 |
| 2003/0149960 A1* | 8/2003 | Inamdar | .......... | G06F 11/3624 717/118 |
| 2004/0123279 A1* | 6/2004 | Boykin | .......... | G06F 11/3644 717/158 |
| 2004/0162989 A1* | 8/2004 | Kirovski | .......... | G06F 21/52 713/189 |
| 2006/0107327 A1* | 5/2006 | Sprigg | .......... | G06F 21/10 726/26 |
| 2006/0150256 A1* | 7/2006 | Fanton | .......... | G06F 21/10 726/27 |
| 2008/0022093 A1* | 1/2008 | Kurien | .......... | G06F 21/51 713/164 |
| 2009/0293101 A1* | 11/2009 | Carter | .......... | G06F 21/6209 726/1 |
| 2011/0107411 A1* | 5/2011 | McClain | .......... | H04L 63/102 726/9 |
| 2011/0247031 A1* | 10/2011 | Jacoby | .......... | H04N 21/4351 725/25 |
| 2014/0032912 A1* | 1/2014 | Hardy | .......... | H04N 1/32144 713/176 |

* cited by examiner

*Primary Examiner* — Michael R Vaughan
(74) *Attorney, Agent, or Firm* — Zilka-Kotab, PC

(57) ABSTRACT

A system, method, and computer program product are provided for conditionally implementing protected content. In use, protected content is identified. Additionally, one or more elements associated with the protected content are verified. Further, the protected content is conditionally implemented, based on the verifying.

20 Claims, 4 Drawing Sheets

SYSTEM, METHOD, AND COMPUTER PROGRAM FOR CONDITIONALLY IMPLEMENTING PROTECTED CONTENT

CLAIM OF PRIORITY

This application is a continuation of U.S. application Ser. No. 13/743,292, filed Jan. 16, 2013, the entire contents of which are incorporated herein by reference.

FIELD OF THE INVENTION

The present invention relates to protecting content, and more particularly to conditionally implementing protected content.

BACKGROUND

Developing applications that execute on a multitude of different devices and different operating systems is a goal of many developers. For example, web based hybrid applications that execute web content in web runtime may be used in order to enable application access via a web based interface. Unfortunately, conventional methods for implementing content in this manner have exhibited various limitations.

For example, current technology may not be able to ensure the security of applications that are being implemented utilizing a web based interface or any web based application code. For example, applications may be copied and code may be reverse engineered, and sensitive application data may be compromised. There is thus a need for addressing these and/or other issues associated with the prior art.

SUMMARY

A system, method, and computer program product are provided for conditionally implementing protected content. In use, protected content is identified. Additionally, one or more elements associated with the protected content are verified. Further, the protected content is conditionally implemented, based on the verifying.

DETAILED DESCRIPTION

Figure 1:
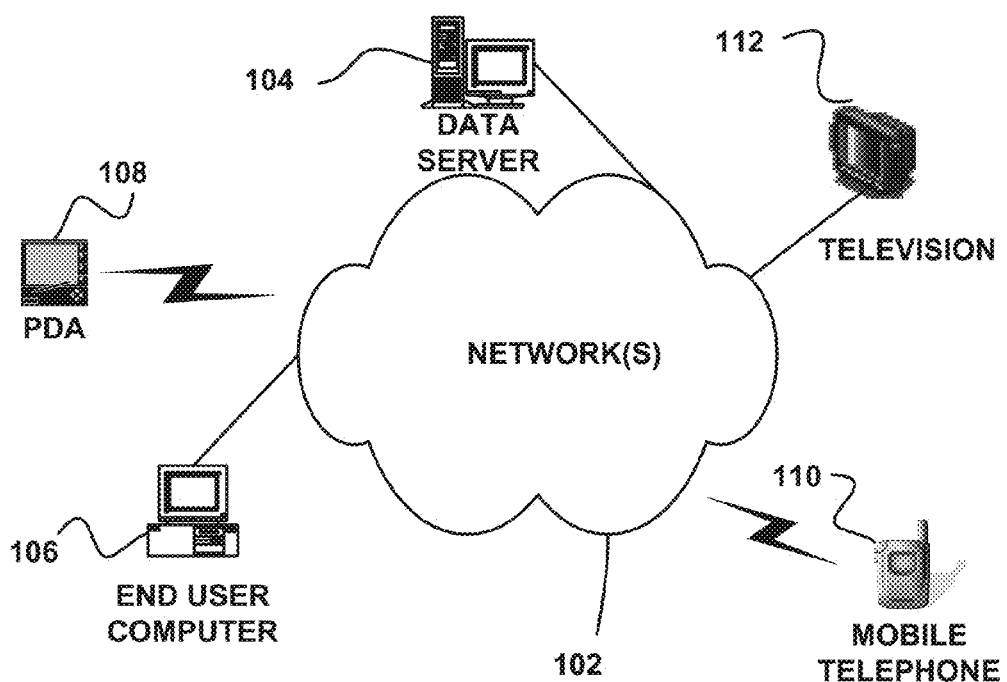
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
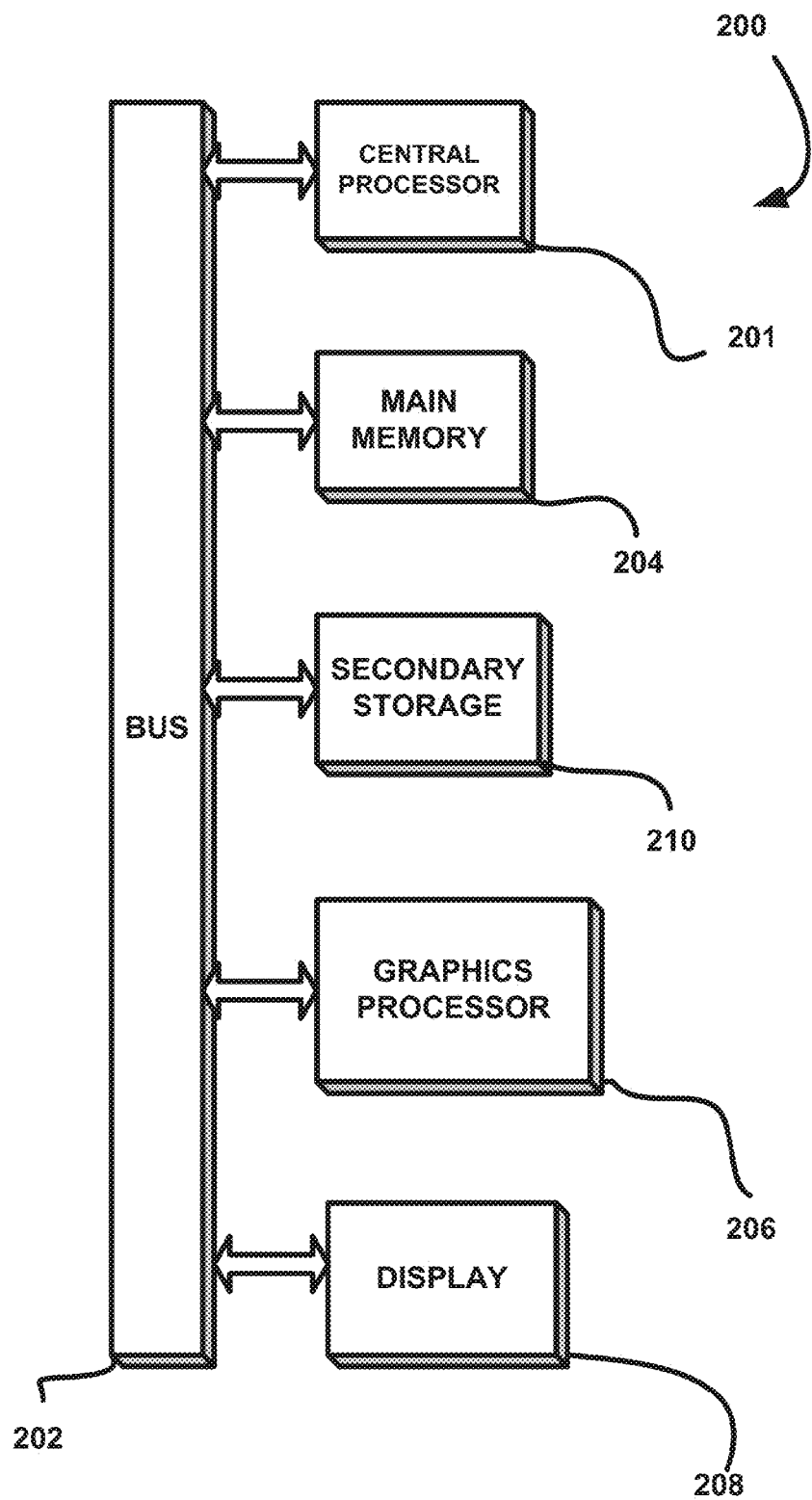
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
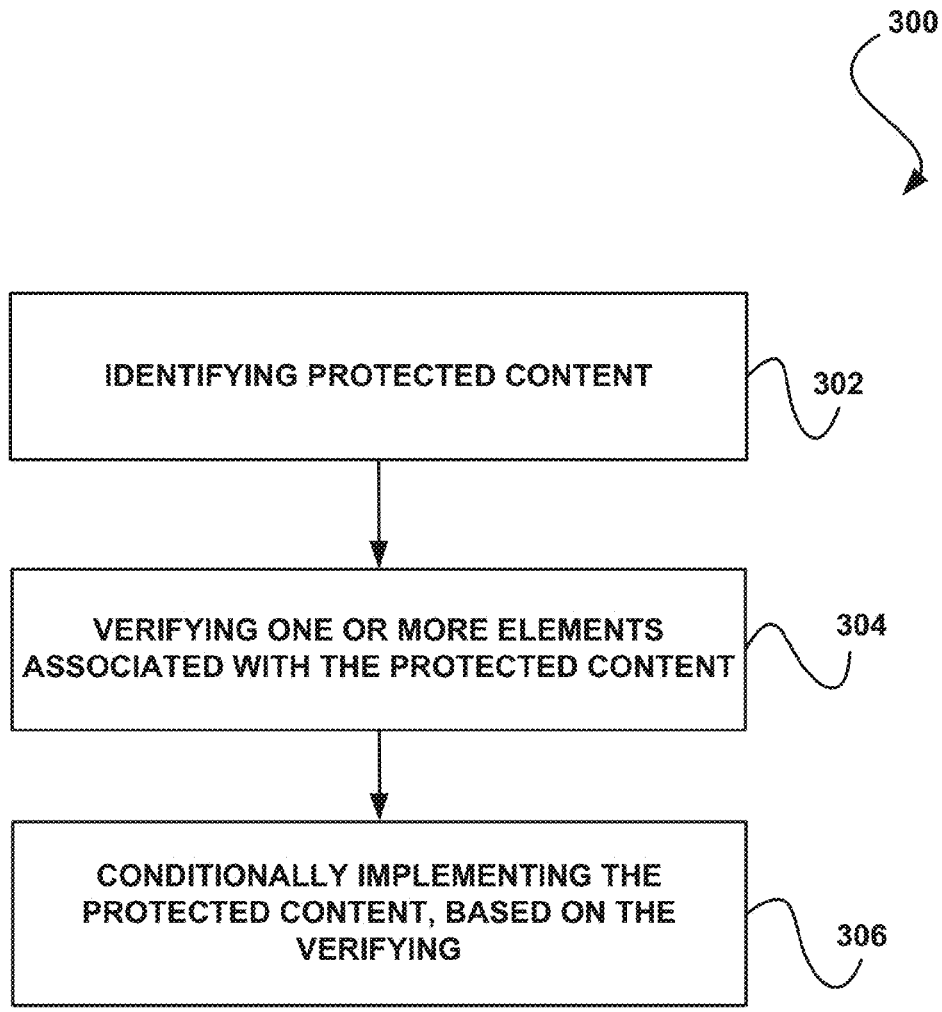
FIG. 3 illustrates a method for conditionally implementing protected content, in accordance with one embodiment.

FIG. 3 illustrates a method 300 for conditionally implementing protected content, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, protected content is identified. In one embodiment, the protected content may be identified in response to a request for the content. For example, the protected content may be identified in response to a request from a runtime module to run the protected content. In another example, the protected content may be identified in response to validating the request from the runtime module.

For example, the request from the runtime module may include a protocol request such as a hypertext transfer protocol (HTTP) request or a hypertext transfer protocol secure (HTTPS) request that may include an access token. Of course, however, the protocol request may include any protocol supported by the regular web runtime. In another example, the access token may be set at the runtime module by a validation module, utilizing a native application programming interface (API) implemented within the runtime module. In yet another example, the protected content may be identified in response to the validation of the access token within the HTTP request. For instance, the access token within the HTTP request may be validated utilizing a validation module before the protected content is identified.

Additionally, in one embodiment, the protected content may be associated with one or more applications. For example, the protected content may include application code that performs one or more actions when executed (e.g., when executed in a runtime environment, etc.). In another example, the protected content may include mobile application code (e.g., HTML5 mobile application code, etc.). In another embodiment, the protected content may include one or more plain text files.

Further, in one embodiment, the protected content may include one or more security measures. For example, the protected content may include one or more signatures (e.g., developer signatures, etc.). In another embodiment, the protected content may include one or more permissions. For example, the protected content may include one or more code permissions defined by the developer, where such code permissions may be associated with one or more of the protected content and additional components accessed by the protected content when the protected content is run.

Further still, in one embodiment, the protected content may be identified by accessing (e.g., reading, etc.) the protected content from a local data store (e.g., a local database, etc.). In another embodiment, the protected content may be identified by accessing the protected content from a non-local data store (e.g., a non-local networked database, etc.) via one or more means (e.g., a computer network, etc.). In yet another embodiment, the protected content may be accessed by local server module (e.g., a local web server, etc.).

For example, the protected content may be accessed by a local web server run within a packaged mobile application that delivers content to a runtime module to be run. In still another embodiment, the local server module may be encapsulated. For example, the local web server may be encapsulated within a packaged application that conditionally answers to standard requests from existing web runtimes within web application content.

Also, as shown in operation 304, one or more elements associated with the protected content are verified. In one embodiment, verifying the one or more elements associated with the protected content may include decrypting the protected content. For example, the protected content may include encrypted content that is read and decrypted by the local server module. In another embodiment, verifying the one or more elements associated with the protected content may include sending the protected content that has been decrypted to the validation module. For example, once the protected content is decrypted, the decrypted content may be sent to the validation module for additional analysis.

In addition, in one embodiment, verifying the one or more elements associated with the protected content may include verifying one or more portions of the protected content once the protected content has been decrypted. For example, one or more signatures may be identified by the validation module within the decrypted content, and the one or more signatures may be verified by the validation module (e.g., by comparing the one or more signatures against one or more stored signatures, etc.). In another example, one or more permissions may be identified by the validation module within the decrypted content, and the one or more permissions may be verified by the validation module (e.g., by confirming that each of the one or more permissions have been met, etc.).

Further, as shown in operation 306, the protected content is conditionally implemented, based on the verifying. In one embodiment, conditionally implementing the protected content may include providing the protected content to the runtime module if the verifying is successful (e.g., if one or more of the protected content have been verified, etc.). For example, if one or more signatures are identified by the validation module within the decrypted content, then the decrypted content may be provided to the runtime module by the local server module if the one or more signatures are verified by the validation module.

In another example, if one or more permissions are identified by the validation module within the decrypted content, then the decrypted content may be provided to the runtime module by the local server module if the one or more permissions are verified by the validation module. In another embodiment, conditionally implementing the protected content may include withholding the protected content from the runtime module if the verifying is not successful (e.g., if one or more of the protected content have not been verified, etc.). For example, if one or more signatures and/or one or more permissions are identified by the validation module within the decrypted content, then the decrypted content may be withheld from the runtime module by the local server module if the one or more signatures and/or permissions are not verified by the validation module.

Further still, in one embodiment, implementing the protected content may include rendering the protected content. For example, the runtime module may render the decrypted content provided to it by the local server module. In another example, the runtime module may render the decrypted content and display one or more elements to one or more users, based on the decrypted content. In yet another example, the decrypted content may include an application that is run by the runtime module, where one or more users may interact with the application through the runtime module.

Also, in one embodiment, the protected content may be controlled while it is implemented. For example, when the runtime module renders the decrypted content provided to it by the local server module, the validation module may monitor such rendering (e.g., by parsing the HTML document object model (DOM), injecting one or more probes, etc.). Additionally, if the validation module detects a violation (e.g., a permission violation, a policy violation, etc.) during such monitoring, the validation module may stop the runtime module, invalidate the access token within the runtime module's HTTP request, etc. In this way, the runtime may be monitored, and content and access may be disabled if an issue is detected during the monitoring.

Additionally, the protected content may be securely stored and implemented. Further, a variety of different security frameworks may be implemented within the protected content. Further still, the content may be protected against threats such as copying, reverse engineering, etc. Also, plain text files of an application may be secured while being used in a standard web runtime of a device.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
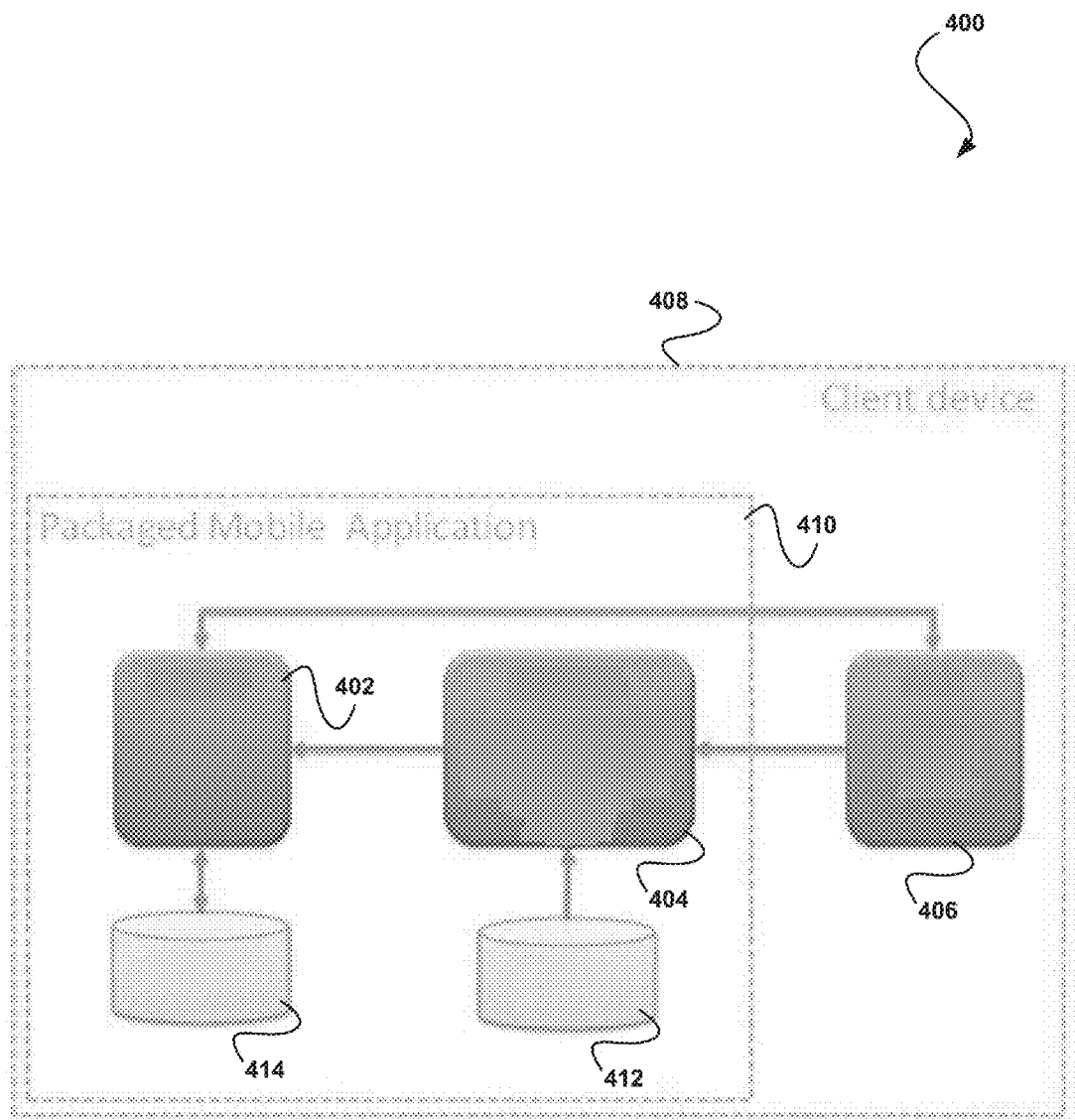
FIG. 4 illustrates a method for securing mobile application code, in accordance with one embodiment.

FIG. 4 illustrates a system 400 for securing mobile application code, in accordance with one embodiment. As an option, the system 400 may be carried out in the context of the details of FIGS. 1-3. Of course, however, the system 400 may be carried out in any desired environment. Further, the aforementioned definitions may equally apply to the description below.

As shown, a validation module 402 is implemented within a client device 408. Additionally, a local server module 404 and a runtime module 406 are implemented within a packaged mobile application 410 of the client device 408. In one embodiment, the packaged mobile application 410 may include a hybrid mobile application. In another embodiment, the local server module 404 may deliver content to the runtime module 406. In yet another embodiment, the validation module 402 may verify content according to rules (e.g., rules defined by an application developer, etc.).

Also, in one embodiment, the runtime module 406 may be executed in memory, and may execute web content (e.g., HTML pages, JavaScript (JS) libraries, cascading style sheets (CSS) pages or instructions, etc.). In still another embodiment, the validation module 402, the local server module 404, and the runtime module 406 may be included within a client-side execution environment running on the client device 408 that may load and run protected content (e.g., mobile HTML5 application code, etc.).

Additionally, in one embodiment, the runtime module 406 may trigger the retrieval of protected content (e.g., HTML5 content, etc.) by sending a protected content request. For example, the WRT may initiate the retrieval of bootstrap HTML content by sending the request (e.g., content including "http://[local server module name]/index.html," etc.). In another embodiment, the validation module 402 may implement a native application programming interface (API) with the runtime module 406. In yet another embodiment, implementing the native API may include setting a specific access token that corresponds to the request for protected content sent from the runtime module 406.

Further, in one embodiment, the local server module 404 may receive the protected content request from the runtime module 406 as a HTTP request. In another embodiment, the HTTP request may include the access token. In yet another embodiment, the local server module 404 may verify with the validation module 402 that the access token included in the HTTP request is valid. In still another embodiment, the local server module 404 may read a protected (e.g., encrypted, etc.) version of the protected content from a data store 412. In one embodiment, the data store may include a database, a network, etc.

Further still, in one embodiment, the local server module 404 may decrypt the protected version of the protected content and may send the decrypted version to the validation module 402 (e.g., via a runtime memory channel, APIs, etc.). In another embodiment, the validation module 402 may verify the decrypted version of the protected content, utilizing verification data 414. For example, the validation module 402 may access the verification data 414, where such data includes one or more permissions, one or more signatures, etc. Additionally, the validation module 402 may verify the content by comparing the content against the verification data 414. In another embodiment, the one or more permissions and/or the one or more signatures may be implemented by a developer of the content.

Also, in one embodiment, if the protected content passes the verification of the validation module 402, the validation module 402 may notify the local server module 404, and the local server module 404 may deliver the protected content to the runtime module 406 (e.g., utilizing an HTTP response, etc.). In another embodiment, the runtime module 406 may then render the protected content for one or more end users. In yet another embodiment, the validation module 402 may control the content during the rendering of the content by the runtime module 406. For example, the validation module 402 may parse the HTML DOM, as well as dynamically introspect the content by injecting JavaScript probes into the content, etc. In still another embodiment, if one or more violations are detected by the validation module 402 during the rendering of the content, the validation module 402 may perform one or more actions (e.g., stop the runtime module 406, invalidate the access token, etc.).

In this way, developers may be able to secure their content and the execution of such content. For example, after compilation of the content, if an object format is not considered to be sufficiently protected then a developer can obfuscate the code comprising the content, which may make the code unreadable and not re-usable through techniques such as reverse engineering. Additionally, a developer may sign their content code, which may guarantee the origin of the content code and may also guarantee that such content code has not been altered after the signature has been added. The code may then be executed safely by software that recognizes the signature.

Further, a developer may define one or more code permissions to help protect one or more of resources and operations from unauthorized use. For example, the permissions may be defined in code components of the protected content drafted by the developer, but such permissions may also apply to additional software components that may be loaded and/or used by the protected content. Further still, the system 400 may allow writing and deploying content such as HTML5 applications with the same protection that may be provided to native applications. Also, the content may include plain text files of an application, and such content may be secured while still using a standard runtime module 406 of the client device 408.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
    receiving a hypertext transfer protocol (HTTP) request for protected content, the protected content including encrypted application code having:
    a plurality of developer signatures, and
    a plurality of code permissions defined by a developer of the code within code components of the protected content, the code permissions protecting one or more of resources and operations from unauthorized use;
    verifying a plurality of elements associated with the protected content, including:
    verifying the developer signatures against stored signatures, and
    verifying that the code permissions have been met;
    implementing the protected content, when the elements associated with the protected content have been verified; and
    while implementing the protected content, monitoring a runtime of the protected content to detect violations of the code permissions and to prevent the one or more of resources and operations from the unauthorized use.

2. The computer program of claim 1, wherein the HTTP request is received from a runtime module to run the protected content.

3. The computer program of claim 2, wherein the HTTP request includes an access token.

4. The computer program of claim 3, wherein the access token is set at the runtime module by a validation module, utilizing a native application programming interface (API) implemented within the runtime module.

5. The computer program of claim 1, wherein the protected content includes mobile application code.

6. The computer program of claim 1, wherein the protected content is stored in a local data store.

7. The computer program of claim 1, wherein verifying the plurality of elements associated with the protected content further includes decrypting the protected content.

8. The computer program of claim 7, wherein verifying the plurality of elements associated with the protected content further includes sending the protected content that has been decrypted to a validation module.

9. The computer program of claim 8, wherein verifying the plurality of elements associated with the protected content includes verifying the developer signatures and the code permissions once the protected content has been decrypted.

10. The computer program of claim 9, wherein the plurality of developer signatures are verified by the validation module.

11. The computer program of claim 10, wherein plurality of code permissions are identified by the validation module within the decrypted content, and the code permissions are verified by the validation module.

12. The computer program of claim 1, wherein the protected content is withheld from a runtime module when the elements associated with the protected content have not been verified.

13. The computer program of claim 1, wherein the protected content is controlled by a validation module that performs one or more of content parsing and dynamic introspection.

14. The computer program of claim 1, further comprising rendering the protected content, and controlling the protected content during the rendering by injecting a plurality of JavaScript probes into the protected content in order to detect one or more violations during the rendering of the protected content.

15. The computer program of claim 1, wherein the code permissions are associated with the protected content and are associated with additional software components accessed by the protected content when the protected content is run.

16. The computer program of claim 1, further comprising, upon detecting a violation of the code permissions during the monitoring, stopping the implementation of the protected content.

17. The computer program of claim 1, further comprising, upon detecting a violation of the code permissions during the monitoring, invalidating an access token within the HTTP request.

18. A method, comprising:
receiving a hypertext transfer protocol (HTTP) request for protected content, the protected content including encrypted application code having:
a plurality of developer signatures, and
a plurality of code permissions defined by a developer of the code within code components of the protected content, the code permissions protecting one or more of resources and operations from unauthorized use;
verifying a plurality of elements associated with the protected content, including:
verifying the developer signatures against stored signatures, and
verifying that the code permissions have been met;
implementing the protected content, when the elements associated with the protected content have been verified; and
while implementing the protected content, monitoring a runtime of the protected content to detect violations of the code permissions and to prevent the one or more of resources and operations from the unauthorized use.

19. The method of claim 1, wherein the HTTP request is received from a runtime module to run the protected content.

20. A system, comprising:
a memory storing instructions; and
a hardware processor that executes the instructions stored in the memory to perform a method comprising:
receiving a hypertext transfer protocol (HTTP) request for protected content, the protected content including encrypted application code having:
a plurality of developer signatures, and
a plurality of code permissions defined by a developer of the code within code components of the protected content, the code permissions protecting one or more of resources and operations from unauthorized use;
verifying a plurality of elements associated with the protected content, including:
verifying the developer signatures against stored signatures, and
verifying that the code permissions have been met;
implementing the protected content, when the elements associated with the protected content have been verified; and
while implementing the protected content, monitoring a runtime of the protected content to detect violations of the code permissions and to prevent the one or more of resources and operations from the unauthorized use.

* * * * *